US012580751B2

(12) United States Patent
Soriente et al.

(10) Patent No.: US 12,580,751 B2
(45) Date of Patent: Mar. 17, 2026

(54) FAST POST-QUANTUM CRYPTOGRAPHIC SORTITION

(71) Applicant: NEC Laboratories Europe GmbH, Heidelberg (DE)

(72) Inventors: Claudio Soriente, Heidelberg (DE); Dario Fiore, Pozuelo de Alarcon (ES)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 18/291,257

(22) PCT Filed: Aug. 20, 2021

(86) PCT No.: PCT/EP2021/073178
§ 371 (c)(1),
(2) Date: Jan. 23, 2024

(87) PCT Pub. No.: WO2023/016665
PCT Pub. Date: Feb. 16, 2023

(65) Prior Publication Data
US 2024/0364506 A1     Oct. 31, 2024

(30) Foreign Application Priority Data

Aug. 13, 2021    (EP) ..................................... 21191370

(51) Int. Cl.
*H04L 9/08*          (2006.01)
(52) U.S. Cl.
CPC .................................. *H04L 9/0852* (2013.01)
(58) Field of Classification Search
CPC ........ H04L 9/0852; H04L 9/50; H04L 9/3239
See application file for complete search history.

(56) References Cited

U.S. PATENT DOCUMENTS

2020/0396059 A1* 12/2020 Micali ................... H04L 63/123

OTHER PUBLICATIONS

Boneh, Dan et al.; "Algebraic Pseudorandom Functions with Improved Efficiency from the Augmented Cascade"; *Proceedings of the 17th ACM Conference on Computer and Communications Security;* Aug. 13, 2010; pp. 131-140; vol. 20100817:100737; XP061004204; International Association for Cryptologic Research; Santa Barbara, CA, USA.

(Continued)

*Primary Examiner* — Baotran N To
(74) *Attorney, Agent, or Firm* — Leydig, Voit & Mayer, Ltd.

(57) ABSTRACT

A method for cryptographic sortition among a group of parties includes committing, by a first party, to a set of n party-specific secret keys $k_1$, $k_n$ for a block cipher E and obtaining, by the first and a second party, a common input x and an index r. The method further includes encrypting, by the first party, the input x with the r-th key $k_r$ of the committed keys $k_1, \ldots, k_n$, thereby generating an output $y_1$ of the block-cipher E, and publishing the output $y_1$ with the key $k_r$ used for encryption. The method further includes encrypting, by the second party, the common input x with the published key $k_r$, thereby generating an output $y_1'$ of the block-cipher E, and comparing the generated output $y_1'$ with the published output $y_1$. The method can be used to optimize the cryptographic sortition and support secure decision making.

20 Claims, 2 Drawing Sheets

(56)     References Cited

OTHER PUBLICATIONS

Buser, Maxime et al.; "Post-Quantum Verifiable Random Function from Symmetric Primitives in PoS Blockchain"; *2022 European Symposium on Research in Computer Security,* Mar. 8, 2021; pp. 25-45; vol. 20210309: 134732; XP061052394; International Association for Cryptologic Research; Santa Barbara, CA, USA.

Esgin, Muhammed F. et al.; "Practical Post-Quantum Few-Time Verifiable Random Function with Applications to Algorand"; *25th International Conference on Financial Cryptography and Data Security-Revised Selected Papers, Part II;* Mar. 1, 2021; pp. 560-578; ACM Publications; New York, NY, USA.

Gilad, Yossi et al.; "Argorand: Scaling Byzantine Agreements for Cryptocurrencies"; *SOSP '17: Proceedings of the 26th Symposium on Operating Systems Principles;* Oct. 14, 2017; pp. 51-68; XP055573405; ACM Publications; New York, NY, USA.

* cited by examiner

FAST POST-QUANTUM CRYPTOGRAPHIC SORTITION

CROSS REFERENCE TO RELATED APPLICATIONS

This application is a U.S. National Phase application under 35 U.S.C. § 371 of International Application No. PCT/EP2021/073178, filed on Aug. 20, 2021, and claims benefit to European Patent Application No. EP 21191370.2, filed on Aug. 13, 2021. The International Application was published in English on Feb. 16, 2023 as WO 2023/016665 A1 under PCT Article 21 (2).

FIELD

The present invention relates to the field of cryptology. More specifically, the present invention relates to a computer-implemented method for execution of a cryptographic sortition among a group of parties.

BACKGROUND

A Verifiable Random Function (VRF) is essentially a keyed function that, on arbitrary inputs, outputs values that look pseudorandom to third parties that do not have access to the key. Further, each evaluation of the function provides, apart from the output, a verification token that allows third parties to verify that the function was computed correctly.

Distributed applications, such as blockchains based on proof-of-stake, use VRFs to carry out sortitions (cf. Yossi Gilad et al.: "Algorand: Scaling Byzantine Agreements for Cryptocurrencies", SOSP '17: Proceedings of the 26$^{th}$ Symposium on Operating Systems Principles, October 2017, p. 51-68, https://doi.org/10.1145/3132747.3132757). For example, in proof-of-stake blockchains, each node defines its own VRF by fixing a secret key. Next, given a common input x, each node broadcasts the output of its VRF evaluated on x along with a proof that evaluation was carried out correctly. Among all nodes that broadcasted a correct output, the leaders are elected according to some pre-defined, public rule. For example, the nodes that broadcasted the largest outputs, among all nodes that broadcasted a correct output, are elected as leaders.

State-of-the-art VRFs are based on elliptic curves or bilinear maps; thus, they are expensive to compute and do not provide post-quantum security (as described in the above-mentioned reference). Recently proposed VRFs, which are post-quantum secure, are based on lattices. However, they are computationally more expensive than their non post-quantum secure alternatives (cf. Muhammed F. Esgin et al.: "Practical Post-Quantum Few-Time Verifiable Random Function with Applications to Algorand", Cryptology ePrint Archive, Report 2020/1222, https://eprint.iacr.org/2020/1222).

SUMMARY

In an embodiment, the present disclosure provides a computer-implemented method for execution of a cryptographic sortition among a group of parties. The computer-implemented method comprises: committing, by a first party of the group, to a set of n party-specific secret keys $k_1$, $k_n$ for a block cipher E; obtaining, by the first party and at least a second party of the group, a common input x and an index r; encrypting, by the first party, the input x with the r-th key $k_r$ of the committed keys $k_1$, . . . , $k_n$, thereby generating an output $y_1$ of the block-cipher E, and publishing the output $y_1$ together with the key $k_r$ used for encryption; and encrypting, by the second party, the common input x with the key $k_r$ published by the first party, thereby generating an output $y_1'$ of the block-cipher E, and comparing the generated output $y_1'$ with the output $y_1$ published by the first party. The method can be used to optimize the cryptographic sortition and support secure decision making.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
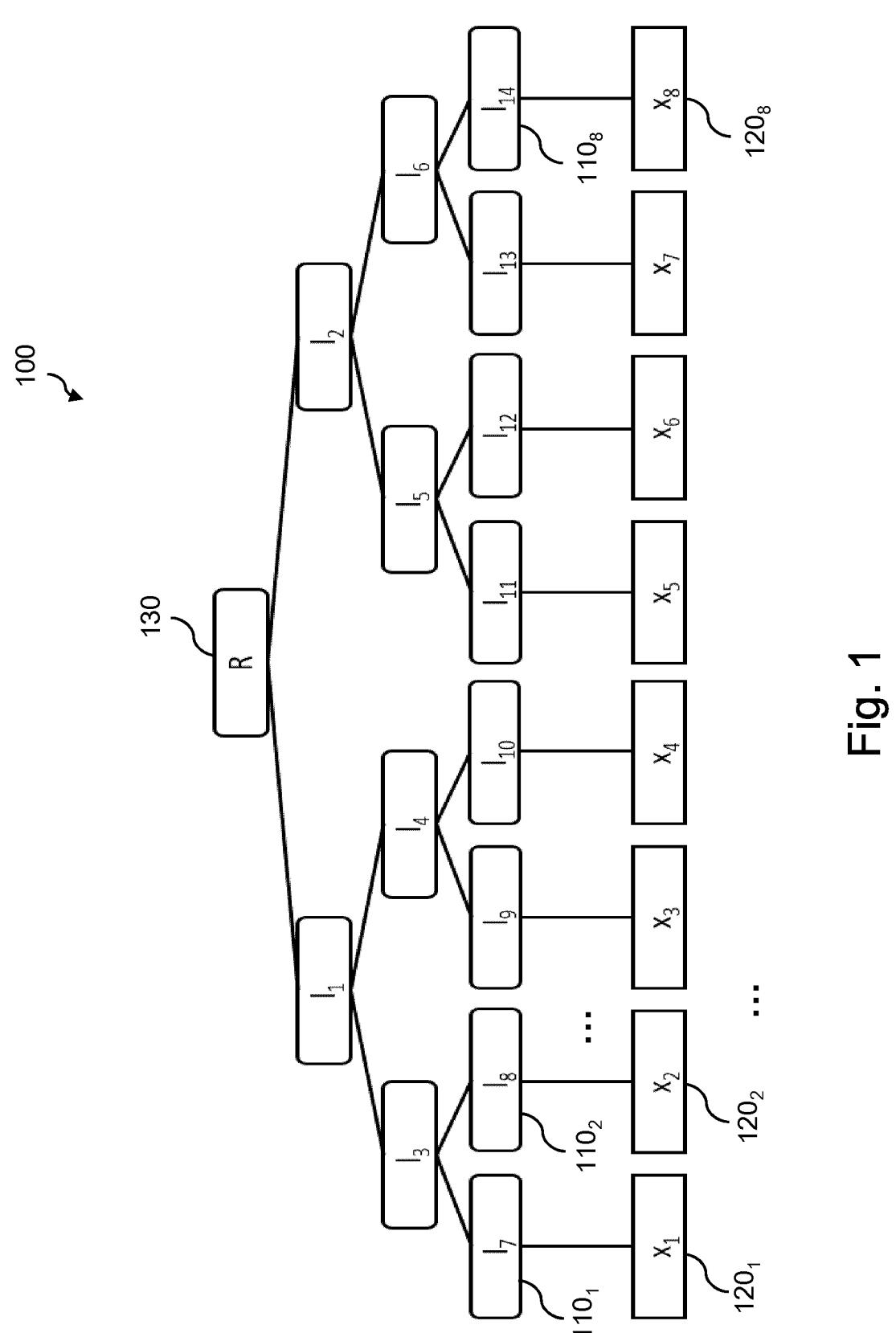
FIG. 1 is a diagram illustrating a Merkle tree that is manipulated by some functions used in the context of an embodiment of the present invention.

In accordance with an embodiment, the present invention improves and further develops a method of the initially described type for execution of a cryptographic sortition among a group of parties in such a way that it provides post-quantum security, while at the same time being computationally less expensive and faster than hitherto existing solutions.

In accordance with another embodiment, the present invention provides a computer-implemented method for execution of a cryptographic sortition among a group of parties, the method comprising committing, by a first party of the group, to a set of n party-specific secret keys $k_1$, . . . , $k_n$ for a block cipher E; obtaining, by the first party and at least a second party of the group, a common input x and an index r; encrypting, by the first party, the input x with the r-th key $k_r$ of the committed keys $k_1$, . . . , $k_n$, thereby generating an output $y_1$ of the block-cipher E, and publishing the output $y_1$ together with the key $k_r$ used for encryption; and encrypting, by the second party, the common input x with the key $k_r$ published by the first party, thereby generating an output $y_1'$ of the block-cipher E, and comparing the generated output $y_1'$ with the output $y_1$ published by the first party.

Furthermore, in accordance with another embodiment, the present invention provides a corresponding host processing system of a party of a group of parties for execution of a cryptographic sortition among the group of parties and a non-transitory computer readable medium for execution of a cryptographic sortition among a group of parties, respectively, as specified in the independent claims.

Embodiments of the present invention introduce an n-time-secure VRF that is solely based on symmetric-key primitives. The term "n-time secure" refers to the fact that the VRF can be evaluated on up to n distinct points, where n is a system parameter. As such, the proposed VRF is faster than currently used VRFs and is also post-quantum secure. Compared to state-of-the-art VRF that, once defined, can be evaluated over an arbitrary number of inputs, the proposed VRF is secure only if it is evaluated on a given number of inputs and this parameter, denoted as n, may be set when the function is generated. Nevertheless, according to embodiments of the invention it has been recognized that an n-time-secure VRF is sufficient to build a sortition protocol. According to embodiments of the invention, the sortition protocol uses the output of a block cipher evaluated with a client-specific secret key on a round-specific input as a pseudo-random value to determine the outcome of a sortition.

According to an embodiment, the present invention provides a method for implementing a cryptographic sortition by using solely symmetric-key cryptographic primitives, wherein the method comprises the steps of 1) Committing, by a client, to a set of n secret keys $k_1, \ldots, k_n$ for a block cipher;

2) Obtaining, from a blockchain or a trusted party an input x and an index r;

3) Encrypting, by the client, the input x of step 2) with the r-th key $k_r$ committed at step 1);

4) Publishing, by the client, the output of the block-cipher y and the key $k_r$ used during step 3); and 5) Comparing, by a second client, the output of the block-cipher when encrypting the input x received at step 2) with the key $k_r$ received at step 4) against the value y received at step 4).

According to an embodiment, the cryptographic sortition may be executed in each election round of a leader election scheme of a proof-of-stake based blockchain. In this context, the index r may determine the value of a counter for the respective election round. By using the cryptographic sortition for a leader election protocol in proof-of-stake based blockchains, the throughput of blockchain applications can be significantly enhanced.

According to an embodiment, it may be provided that the second party adds the first party to a set of elected leaders in case i) output $y_1$ is determined to conform with a pre-defined, public election rule, and ii) the generated output $y_1'$ is identical with the output $y_1$ published by the first party. For example, the election rule may be modeled with a Boolean function that designates a party as one of the leaders if its VRF output lies in a pre-defined interval or exceeds a predefined threshold.

According to an embodiment, the input x may be round-specific and the participating parties may commit to the set of party-specific secret keys $k_1, \ldots, k_n$ before any of the round-specific inputs x are available. This is important to the protocol in order to avoid that a party—having already knowledge of the input x—can then simply chose k in such a way that VRF (k,x) outputs a value that guarantees the party's election.

According to an embodiment, the input x may be round-specific and the participating parties may reveal their party-specific secret key k only after the round-specific input x is available. In this context it is important to note that unless a party publishes y=VRF (k,x) and k, no other party can verify that y was computed correctly.

According to an embodiment, the common input x and the index r that cycles between 1 and n and keeps track of the next election round may be obtained from a blockchain. For example, both x and r could be derived by applying a deterministic function to the last block of a blockchain. Alternatively, the parameters may be obtained from a trusted party.

According to an embodiment, commitment to the set of n party-specific secret keys $k_1, \ldots, k_n$ may be realized by the aid of a Merkle Tree. More specifically, the respective party may build a Merkle Tree by using the keys $k_1, \ldots, k_n$ as input binary strings for the leaf nodes of the tree and by using a hash function H. The respective party may then publish the label R of the root of the resulting Merkle Tree as its public key.

The VRF proposed according to embodiments of the present invention extends the evaluation algorithm Eval( ) with an extra input. In particular, Eval( ) may take as input the secret keys $k_1, \ldots, k_n$, the common input x and the index r, wherein the index r is used to determine which of the secret keys $k_1, \ldots, k_n$ is used to evaluate the function over the input x, and to produce the output $y_1$ and a proof $\pi_1$. According to an embodiment, running the function Eval( ) by a participating party may include the following steps:

calculating the co-path C of node labels from the r-th leaf node of the Merkle Tree to the root, wherein the co-path, given a walk from the i-th leaf to the root, is the set of labels of all siblings of the nodes along the walk;

determining the output $y_1$ by encrypting the input x with the key $k_r$ using block cipher E; and generating a proof $\pi_1$ consisting of tuple $[k_r, C]$.

Finally, the respective party may publish the output $y_1$ together with the proof $\pi_1$.

The VRF proposed according to embodiments of the present invention includes a verification algorithm Verify( ), which may be implemented in form of a deterministic algorithm that on input a public key pk, binary strings x and y, and a proof $\pi$, outputs either 0 (invalid) or 1 (valid). Specifically, according to an embodiment, running the function Verify( ) by a second party—based on the public key $pk_1$ of a first party, the input x, the output $y_1$ and the proof $\pi_1$ received from the first party and the index r—may include the following steps:

parsing the public key pk of the first party as the label R of the root of the Merkle Tree;

parsing the proof $\pi_1$ as $[k_r, C]$;

using co-path C to verify that input x is the input string to the r-th leaf node of the Merkle Tree identified by label R; and if both verifications are successful, outputting 1, otherwise outputting 0.

As already mentioned above, embodiments of the present invention use only symmetric-key primitives. As such, the sortition protocol according to embodiments of the invention is faster than other sortition protocols and achieves post-quantum security. For instance, an AES, Advanced Encryption Standard, block cipher may be used as the block cipher E. With respect to the hash function H it may be provided that this function is selected from the group of SHA, Secure Hash Algorithm, hash functions.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

Distributed applications, such as blockchains based on proof-of-stake, carry out sortitions by using Verifiable Random Functions (VRF). Embodiments of the present invention provide a sortition protocol based on an n-times-secure VRF that is faster than state of the art solutions and that achieves post-quantum security.

Before describing embodiments of the present invention in detail, the concept of VRFs, as far as required for understanding the present invention, will be explained. Generally, a VRF is a tuple of algorithms ParamGen, KeyGen, Eval, Verify defined as follows:

ParamGen is a probabilistic algorithm that on input a security parameter $\lambda$, outputs some global parameters pp. According to embodiments of the invention, the latter is assumed to be implicit input to all of the following algorithms.

KeyGen is a probabilistic algorithm that outputs a secret key sk and a public key pk.

Eval is a deterministic algorithm that on input a binary string x and a secret key sk, outputs a binary string y and a proof $\pi$.

Verify is a deterministic algorithm that on input a public key pk, binary strings x and y, and a proof $\pi$, outputs either 0 (invalid) or 1 (valid).

A VRF is informally correct if, assuming that algorithms ParamGen and KeyGen where honestly executed, then for any binary string x, if Eval(sk, x) outputs [y, $\pi$], then Verify(pk, x, y, $\pi$) outputs 1.

Further, a VRF should be pseudo-random. That is, an adversary should not be able to efficiently distinguish the output of the VRF on an input of its choice x, from a random string of the same length of the VRF output. Pseudo-randomness should hold despite the fact that the adversary has access to VRF output values and their proofs, for inputs of its choice but different from x.

Finally, the VRF should be unique, that is, given a public key pk and an input value x, if Verify(pk, x, $y_1$, $\pi_1$)=Verify (pk, x, $y_2$, $\pi_2$)=1, then $y_1$=$y_2$.

The n-times-secure VRF proposed in accordance with embodiments of the present invention extends the evaluation algorithm Eval with an extra input. In particular, Eval may take as input a secret key sk, an input value x, and—in addition—an index i. The secret key sk is actually a vector of secret keys and index i may be used to determine which of the secret keys of the vector sk is used to evaluate the function over the input value x. Each key can only be used once.

According to embodiments of the invention, some of the algorithms of the VRF may use a number of particular functions that manipulate a Merkle Tree in a specific way. These particular functions, denoted MTCommit, MTOpen and MTVerify herein, and their usage in connection with a Merkle tree will be described hereinafter in detail with reference to FIG. 1.

Given a cryptographic hash function H, a Merkle Tree 100 is a binary tree where each leaf node $110_i$ is labelled with the output of H computed over a binary string $120_i$, whereas each non-leaf node is labelled with the output of H computed over the labels of its child nodes. Hence, a Merkle Tree T is determined by the n input binary strings $120_i$ used to compute the labels of the leaf nodes $110_i$ as well as by the label of its root 130. Specifically, FIG. 1 shows an example of a Merkle Tree 100 with 8 input strings $x_1, \ldots, x_8$. A line between two nodes indicates that the label of the parent node is computed by hashing the label(s) of the child node(s).

Notably, the label of the root 130 can be used as a commitment to the input binary strings $120_i$. In particular, to commit to a list of n binary strings $x_1, \ldots x_n$, a party can build a Merkle Tree T using $x_1, \ldots x_n$ as input and publish the root label R of the resulting tree. On the one hand, the root label of the tree fully determines the input strings $120_i$; on the other hand, the one-wayness property of H, i.e., the fact that given an output of H, it is hard to recover the original input, ensures that the root label does not leak information about the input strings $120_i$.

To prove that a binary string x is the i-th committed input, that same party can publish the "co-path" of node labels from the i-th leaf $110_i$ of T to the root 130. Given a walk from the i-th leaf $110_i$ to the root 130, its co-path is the set of labels of all siblings of the nodes along the walk. For example, the co-path of $x_2$ in the tree of FIG. 1 is $\{l_7, l_4, l_2\}$. Given a root label R, a co-path C, an input x, and an index i, any party can check whether x was the input to the i-th leaf $110_i$ of the Merkle Tree 100 with root label R. To do so, it is sufficient to use x and C to compute all node labels from the i-th leaf $110_i$ to the root 130 and to compare the resulting root label with R; if the two labels are equal (resp. different), then x is accepted (resp. rejected) as the i-th input to the Merkle Tree 100 with root label R.

Continuing with the example of FIG. 1, given the root R label, the co-path $\{l_7, l_4, l_2\}$ and input x, to verify whether x is input to the second leaf $110_2$ of the tree determined by R, a party will compute $l'_8=H(x)$, $l'_3=H(l_7,l'_8)$, $l'_1=(l'_3,l_4)$, $R'=H(l'_1,l_2)$ and check whether R' matches R. It should be noted that the number of elements in the co-path is proportional to n (i.e., the number of input strings $120_i$).

In the context of the present disclosure, the following definitions and notations are used:

T:=MTCommit(H, $x_1, \ldots x_n$) to denote the algorithm that computes the Merkle Tree from a list of n input strings $x_1, \ldots x_n$, by using hash function H.

[x, C]:=MTOpen (H, T, x, i) to denote the algorithm that outputs the co-path C as a proof that x is the input string to the i-th leaf of T. For notational convenience it is assumed herein that MTOpen also outputs the input string x.

MTVerify(H, R, x, i, C) to denote the algorithm that uses co-path C to verify whether x is the input string to the i-th leaf of the tree identified by label R.

Turning now back to the n-time secure VRF provided in accordance with embodiments of the present invention, the above algorithms for manipulation of a Merkle Tree may be utilized in connection with the VRF algorithms. For instance, let E be a block cipher where E(k,m) denotes the encryption of message m with secret key k. Also let MTCommit(H, $x_1, \ldots x_n$), MTOpen (H, T, x, i), and MTVerify(H, R, x, i, C) denote the algorithms to manipulate a Merkle Tree as defined above.

According to an embodiment, the parameters of the VRF may be generated by the VRF's algorithm ParamGen as follows: ParamGen may be designed to output globally valid public parameters pp, including a description of the block cipher E (for example AES-128) and a description of the hash function H (for example SHA-256) to be used by the algorithms that manipulate Merkle Trees. Furthermore, ParamGen may output an upper bound to the number of function evaluation n. The public parameters pp may be assumed to be implicit input for all of the following algorithms.

According to an embodiment, the key pair used by the VRF, i.e. private key sk and public key pk, may be generated by the VRF's algorithm KeyGen as follows:

Pick n random keys $k_1, \ldots, k_n$ for the block cipher E;

Compute T:=MTCommit(H, $k_1, \ldots, k_n$); and

Set sk:=($k_1, \ldots k_n$) and pk:=R, where R is the root label of T.

According to an embodiment, the evaluation algorithm Eval( ) used by the VRF may take as input a secret key sk, an input value x, and—in addition to current prior art approaches—an index i, i.e. Eval(sk, x, i). As explained above, the secret key sk is a vector of secret keys (namely, sk:=($k_1, \ldots k_n$)) and index i is used to determine which of the secret keys of the vector sk is used to evaluate the function over the input value x. Each key can only be used once. The evaluation algorithm may execute the following processing steps:

Parse sk as $k_1, \ldots, k_n$;

Compute $[k_i, C] := \text{MTOpen } (H, T, k_i, i)$; and $$\text{Set } y = E(k_i, x) \text{ and } \pi := [k_i, C].$$

According to an embodiment, the verification algorithm Verify( ) used by the VRF may take as input a public key pk, an input value x, an output value y, an index i and a proof $\pi$, i.e. Verify(pk, x, y, i, $\pi$). The verification algorithm may execute the following processing steps:

Parse pk as R;

Parse $\pi$ as [k, C];

If E(k, x) is equal to y and MTVerify(H, R, x, i, C) outputs 1, then outputting 1; otherwise outputting 0.

According to embodiments of the present invention, the above VRF is used to carry out sortitions among a number of parties, in particular parties participating in a blockchain. In this context it is assumed that the blockchain provides a common input x for the evaluation of the VRF and a round counter r that cycles between 1 and n and keeps track of the next election round. For example, both x and r could be derived by applying a deterministic function to the respective last block of the blockchain.

Without loss of generality, it is further assumed that each of the participating parties can use a VRF output to tell if the party that provided that output is elected as one of the leaders. For example, the election protocol may designate a party as one of the leaders if its VRF output lies in a pre-defined interval. According to an embodiment of the invention, such leader designations scheme may be modelled with a boolean function Leader( ).

Let $P_1, \ldots, P_m$ be the parties participating to the protocol. Before elections can start, all of them agree on the public parameters of the scheme. Alternatively, public parameters may be chosen by a trusted third party. Let x be the common input and r the value of the counter for the next election round. Party $P_j$ does the following:

If r=1

Run $[sk_j, pk_j] := \text{KeyGen( )}$

Broadcast $pk_j$

Wait to receive $pk_i$ for $i \in \{1, \ldots, m\}$ and $i \neq j$

Set L:=∅

Run $[y_j, \pi_j] := \text{Eval}(sk_j, x, r)$

If Leader $(y_i)$=1

$L := L \cup \{P_j\}$

Broadcast $[y_j, \pi_j]$

Upon reception of $[y_i, \pi_i]$ from $P_i$ where $i \in \{1, \ldots, m\}$ and $i \neq j$ Parse $\pi_i$ as $[k_i, C_i]$ If Verify($pk_i, x, y_i, r, \pi_i$) = 1 AND $y_i = E(k_i, x)$ AND Leader($y_i$) = 1

$L := L \cup \{P_i\}$

Figure 2:
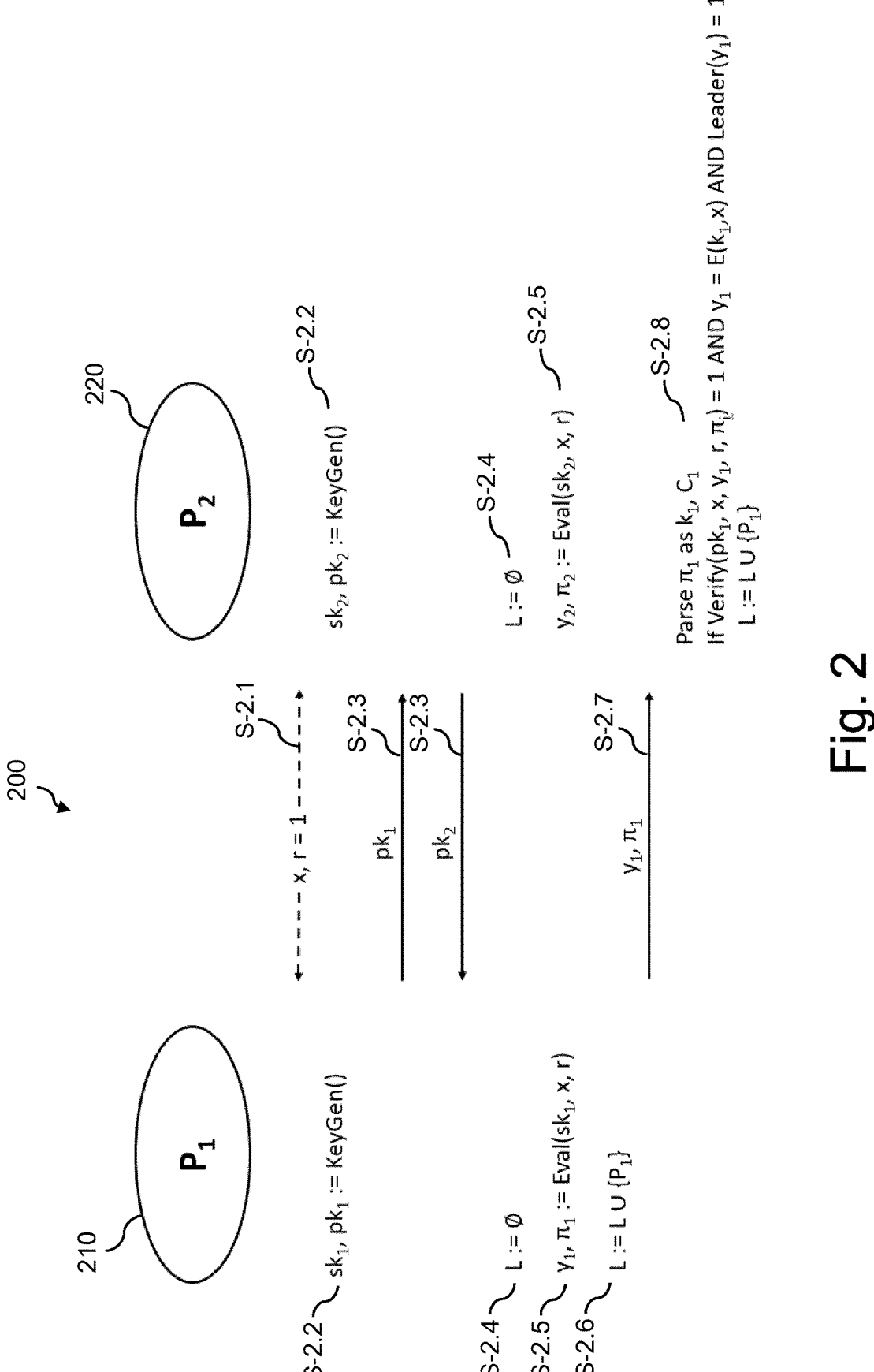
FIG. 2 is a diagram illustrating a cryptographic sortition for electing between two parties in accordance with an embodiment of the present invention.

FIG. 2 shows a simple election scheme 200 between a first party 210 (denoted P1) and a second party 220 (denoted $P_2$) in accordance with an embodiment of the present invention. In the example, the number of participants has been limited to two parties solely for ease of understanding. It will be appreciated by those skilled in the art, however, that in real deployment scenarios, e.g. in connection with the execution of proof-of-stake protocols in blockchains, typically many more participating parties will be involved.

Initially, as shown in FIG. 2 at S_2.1, a round counter r is set to 1 and an input parameter x is determined.

Next, as shown at S_2.2, each of the parties 210, 220 creates a keypair $sk_i$, $pk_i$ and distributes the public key $pk_i$, as shown at S_2.3. According to an embodiment, the key-pairs may be generated by running the KeyGen( ) algorithm of a VRF, as described in detail above.

After the exchange of the public keys $pk_i$, both parties 210, 220 initialize a local set of leaders L for a current election to the empty set (i.e., L:=∅), as shown at S_2.4.

Next, both parties 210, 220 run the VRF's Eval( ) function on input x using their secret keys $sk_i$ to obtain an output value $y_i$ and a proof $\pi_i$, as shown at S_2.5.

Without loss of generality, the example of FIG. 2 assumes that $y_1$ determines the election of $P_1$, whereas $y_2$ dictates that $P_2$ is not elected. Thus, party 210 adds itself to the set of elected leaders L, i.e. $L := L \cup \{P_1\}$, as shown at S_2.6, and distributes $y_1$, $\pi_1$, as shown at S_2.7.

Upon receiving $y_1$, $\pi_1$, party $P_2$ carries out the necessary checks and adds $P_1$ to its set of elected leaders, as shown at S_2.8. The checks carried out by party $P_2$ include to first parse the received proof $\pi_1$ into $k_1$, $C_1$. Next, party $P_2$ runs the verification algorithm Verify( ) on the input of the public key $pk_1$ of party $P_1$, input parameter x, and binary string $y_1$ and proof $\pi_1$, as received from party $P_1$. If the result is 0 (i.e., invalid), party $P_2$ can abort the process, and the set of elected leaders L remains unaltered.

On the other hand, if the result is 1 (i.e., valid), party $P_2$ further checks the correctness of parameter $y_1$ received from party $P_1$. To do so, party $P_2$ uses the block cipher E to encrypt input parameter x with the parsed key $k_1$ and to check whether the result corresponds to $y_1$.

If this is correct, finally, party $P_2$ applies the boolean function Leader( ), which determines whether a party, based on its VRF output, is designated a leader or not, to the VRF output $y_1$ of party $P_1$. If the result is 1, party $P_2$ amends the set of elected leaders L by adding party $P_1$, i.e. $L := L \cup \{P_1\}$.

The process described above can securely be repeated A number of n times, i.e. until r=n. After n sortitions, the participating parties $P_1$ and $P_2$ may renew their secret and public keys, i.e. by running the key generation algorithm KeyGen( ).

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for execution of a cryptographic sortition among a group of parties, the computer-implemented method comprising:

committing, by a first party of the group, to a set of n party-specific secret keys $k_1, \ldots, k_n$ for a block cipher E;

obtaining, by the first party and at least a second party of the group, a common input x and an index r;

encrypting, by the first party, the input x with the r-th key $k_r$ of the committed keys $k_1, \ldots, k_n$, thereby generating an output $y_1$ of the block cipher E, and publishing the output $y_1$ together with the key $k_r$ used for encryption;

encrypting, by the second party, the common input x with the key $k_r$ published by the first party, thereby generating an output $y_1'$ of the block cipher E, and comparing the generated output $y_1'$ with the output $y_1$ published by the first party; and running, by the first party of the group, a deterministic function Eval( ) comprising:

calculating a co-path C of node labels from an r-th leaf node of a Merkle Tree, which was built using the set of n party-specific secret keys $k_1, \ldots, k_n$, to a root of the Merkle Tree, determining the output $y_1$ by encrypting the input x with the key $k_r$ using the block cipher E, generating a proof $\pi_1$ consisting of a tuple $[k_r, C]$, and publishing, by the first party of the group, the output $y_1$ together with the proof $\pi_1$.

2. The method according to claim 1, wherein the cryptographic sortition is executed in each election round of a leader election scheme of a proof-of-stake based blockchain, wherein the index r determines the value of a counter for a respective election round.

3. The method according to claim 1, further comprising:

adding, by the second party, the first party to a set of elected leaders based on determining that:

the output $y_1$ is determined to conform with a pre-defined public election rule, and the comparison of the output $y_1'$ with the output $y_1$ published by the first party shows that both outputs $y_1'$ and $y_1$ match.

4. The method according to claim 1, wherein the input x is round-specific and wherein the parties of the group commit to the set of party-specific secret keys $k_1, \ldots, k_n$ before any of the round-specific inputs x are available.

5. The method according to claim 1, wherein the input x is round-specific and wherein the parties of the group reveal a respective party-specific secret key k after the round-specific input x is available.

6. The method according to claim 1, wherein the common input x and the index r are obtained from a blockchain or a trusted party.

7. The method according to claim 1, wherein the common input x and the index r are derived by applying a deterministic function to the last block of a blockchain.

8. The method according to claim 1, wherein committing, by the first party of the group, to the set of n party-specific secret keys $k_1, \ldots, k_n$ comprises:

building the Merkle Tree by using the set of n party-specific secret keys $k_1, \ldots, k_n$ as input binary strings for leaf nodes and a hash function H; and publishing a label R of the root of the resulting Merkle Tree as a public key of the first party.

9. The method according to claim 8, wherein the deterministic function Eval( ) is of a verifiable random function (VRF) that is configured to take as input the set of n party-specific secret keys $k_1, \ldots, k_n$, the common input x and the index r, wherein the index r is used to determine which of the set of n party-specific secret keys $k_1, \ldots, k_n$ is used to evaluate the function over the input x, and produce the output $y_1$ and the proof $\pi_1$.

10. The method according to claim 9, further comprising:

running, by the second party of the group, a function Verify( ) of the VRF on a public key $pk_1$ of the first party, the input x, the output $y_1$ and the proof $\pi_1$ received from the first party and the index r, the function Verify( ) comprises the steps of:

parsing the public key $pk_1$ of the first party as the label R of the root of the Merkle Tree;

parsing the proof $\pi_1$ as $[k_r, C]$;

using the co-path C to verify that input x is the input string to the r-th leaf node of the Merkle Tree identified by label R; and based on determining that both verifications are successful, outputting 1, otherwise outputting 0.

11. The method according to claim 1, wherein the block cipher E is an Advanced Encryption Standard (AES) block cipher.

12. The method according to claim 8, wherein the hash function H is selected from the group of Secure Hash Algorithm (SHA) hash functions.

13. A host processing system of a party of a group of parties for execution of a cryptographic sortition among the group of parties, the host processing system comprising a processor and a memory, the memory comprising processor executable instructions that, when executed by the processor, cause the processor to perform the following operations:

obtaining a common input x and an index r;

receiving, from another party of the group of parties, an output $y_1$ together with a key $k_r$, wherein the output $y_1$ was generated by the other party by encrypting the input x with the r-th key $k_r$ of a set of n party-specific secret keys $k_1, \ldots, k_n$ for a block cipher E the other party has committed to;

encrypting the common input x with the key $k_r$ received from the other party, thereby generating an output $y_1'$ of the block cipher E, and comparing the generated output $y_1'$ with the output $y_1$ received from the other party; and running a function Verify( ) of a Verifiable Random Function (VRF) on a public key $pk_1$ of the other party, the input x, the output $y_1$ and a proof $\pi_1$ received from the other party and the index r, the function Verify( ) comprising the steps of:

parsing the public key $pk_1$ of the other party as a label R of a root of a Merkle Tree, which was built using the set of n party-specific secret keys $k_1 \ldots , k_n$, parsing the proof $\pi_1$ as $[k_r, C]$;

using a co-path C to verify that input x is the input string to an r-th leaf node of the Merkle Tree identified by label R; and based on determining that both verifications are successful, outputting 1, otherwise outputting 0.

14. A non-transitory computer readable medium for execution of a cryptographic sortition among a group of parties, the computer readable medium storing program code for, when executed by a processor, configuring a host processing system of a party of the group of parties to:

obtain a common input x and an index r;

receive, from another party of the group of parties, an output $y_1$ together with a key $k_r$, wherein the output $y_1$ was generated by the other party by encrypting the input x with the r-th key $k_r$ of a set of n party-specific secret keys $k_1, \ldots , k_n$ for a block cipher E the other party has committed to;

encrypt the common input x with the key $k_r$ received from the other party, thereby generating an output $y_1'$ of the block cipher E, and compare the generated output $y_1'$ with the output $y_1$ received from the other party; and running a function Verify( ) of a Verifiable Random Function (VRF) on a public key $pk_1$ of the other party, the input x, the output $y_1$ and a proof $\pi_1$ received from the other party and the index r, the function Verify( ) comprising the steps of:

parsing the public key $pk_1$ of the other party as a label R of a root of a Merkle Tree, which was built using the set of n party-specific secret keys $k_1, \ldots , k_n$, parsing the proof $\pi_1$ as $[k_r, C]$;

using a co-path C to verify that input x is the input string to an r-th leaf node of the Merkle Tree identified by label R; and based on determining that both verifications are successful, outputting 1, otherwise outputting 0.

15. The method according to claim 1, wherein the first party is elected as a leader based on the output $y_1$ being in a pre-defined interval or exceeding a predefined threshold.

16. The method according to claim 1, wherein a number of sortition rounds is bounded by n.

17. The method according to claim 9, wherein the VRF is based solely on symmetric-key primitives.

18. The host processing system according to claim 13, wherein the block cipher E is an Advanced Encryption Standard (AES) block cipher.

19. The host processing system according to claim 13, wherein the VRF is based solely on symmetric-key primitives.

20. The non-transitory computer readable medium according to claim 14, wherein the VRF is based solely on symmetric-key primitives.

\* \* \* \* \*